United States Patent Office 3,650,983
Patented Mar. 21, 1972

3,650,983
ALKALINE WASH REACTIVATION OF PALLADIUM CATALYSTS USED IN VINYL ACETATE SYNTHESIS
Franklyn D. Miller, Cincinnati, Ohio, assignor to National Distillers and Chemical Corporation, New York, N.Y.
No Drawing. Continuation-in-part of application Ser. No. 615,067, Feb. 10, 1967. This application Dec. 23, 1969, Ser. No. 887,736
Int. Cl. B01j 11/14, 11/10
U.S. Cl. 252—412
7 Claims

ABSTRACT OF THE DISCLOSURE

A method for the reactivation of a palladium catalyst having a reduced activity by washing the catalyst with an alkaline solution such as sodium hydroxide, potassium hydroxide, sodium acetate, potassium acetate, and mixtures thereof. The catalyst is preferably a palladium metal or a catalyst comprising a combination of palladium and gold which has been preactivated with an alkaline material and which has been employed in the preparation of vinyl acetate from ethylene.

This application is a continuation-in-part of copending application Ser. No. 615,067, filed Feb. 10, 1967, now abandoned.

This invention relates to an improved process for the production of unsaturated esters of organic acids. More particularly, the invention pertains to a method for the reactivation of palladium catalysts employed in the production of vinyl acetate from ethylene, oxygen and acetic acid.

Moiseev et al., Doklady Akad. Nauk, S.S.S.R., vol. 133, pages 377–380 (1960) disclosed the preparation of vinyl acetate from ethylene, sodium acetate, liquid acetic acid, and a palladium catalyst. It was further reported that no vinyl acetate was obtained in the absence of sodium acetate in the reaction mixture. In U.S. Pat. No. 3,190,912, issued to Robinson in 1965, vinyl acetate was prepared by reacting, in the vapor process, ethylene oxygen and acetic acid in the presence of a palladium catalyst. However, certain special problems result from the use of a palladium catalyst, especially in an oxidizing atmosphere, and the palladium catalyst has been activated with sodium acetate or potassium acetate in order to obtain increased yields of the vinyl acetate. Nevertheless, it has been found there is a serious decrease in the activity of the catalyst during the synthesis, which is undesirable in commercial operations. Thus, in Belgium Pat. No. 66,465 the palladium catalyst was reported as having a life of only 40 hours. This decrease in catalyst activity is particularly disadvantageous in continuous or semi-continuous operations wherein the catalyst is used for relatively long periods of time.

The problems of catalyst stability and active catalyst life have been recognized in this art, and there have been numerous proposals involving possible solutions. Recently, it has been found that a superior vinylation process could be achieved by utilizing a palladium catalyst containing gold or platinum. The amount of gold, for example, in the catalyst may vary from about 5 to 80% by weight based on the total weight of the metals. Preferably, the amount of gold will range from about 5 to 20% by weight. When a palladium-gold containing catalyst is employed for oxidizing ethylene to vinyl acetate in the presence of acetic acid and oxygen or an oxygen-containing gas, the active life or the stability of the catalyst markedly increased, especially in comparison to the palladium containing catalyst heretofore employed. The use of palladium-gold containing catalysts also led to an improvement in the rate of vinyl acetate production as well as in the catalyst life. As hereinafter described the palladium metal or the palladium-gold containing catalyst can be used as such or in conjunction with an inert carrier material; and furthermore, the catalyst is usually preactivated by initially adding thereto a minor amount of an alkali metal or alkaline earth metal organic acid salt or inorganic acid salt. Despite the use of these conventional features and regardless whether or not the catalyst is palladium metal or a combination of palladium and gold metals, a marked decrease in catalyst activity with time has been observed in the synthesis of unsaturated esters. Although the exact reason for this loss in activity is not fully understood at this time, it is believed that possible contributing factors include deposition of inorganic or organic contaminants in the feed materials on the catalyst bed, and poisoning of the catalyst bed with metallic contaminants from corrosion products. Whatever may be the cause of such loss in catalyst activity, its occurrence is highly undesirable from the standpoint of large scale commercial operations.

One object of the present invention is to provide a method for reactivating a palladium-containing catalyst so as to avoid the aforementioned loss in activity.

Another object of the present invention is to provide an improved process for the preparation of unsaturated esters of organic carboxylic acids utilizing a palladium-containing catalyst.

A further object of this invention is to provide an improved process for the preparation of vinyl acetate from ehtylene, acetic acid and oxygen utilizing a palladium-containing catalyst.

These and other objects of this invention will become more readily apparent from the ensuing description and illustrative embodiments.

In accordance with the present invention, it has now been found that loss in catalystic activity can be obviated by soaking the catalyst bed with an alkaline solution or by passing the alkaline solution through the catalyst bed. The reactivation treatment is generally carried out under ambient temperature and pressure conditions. The effluent from the initial washings are quite dark, and generally treatment is continued until the effluent is either substantially colorless or a very light straw color. When the catalyst bed is soaked in the alkaline solution, the soaking is maintained for about 0.25 to 4 hours, and preferably from about 0.25 to 1 hour. When the treatment is completed, the catalyst bed is drained and the water evaporated at an elevated temperature ranging from about 60° to 200° C. under a stream of an inert gas such as nitrogen, argon, or the like.

For most purposes, the alkaline solution employed in the practice of this invention will be an aqueous solution. However, solvents other than water may be employed and include such conventional solvents as alkanols, nitriles, esters, etc. Specific examples of such other solvents are methanol, acetonitrile, ethanol, dioxane, isopropanol, and the like. Mixtures of solvents may also be utilized. The present invention will hereinafter be illustrated with respect to the use of an aqueous alkaline solution. Preferably, the water employed in formulating the alkaline solution is distilled or deionized.

The alkaline component of the reactivation solution is an alkali metal or alkaline earth metal organic acid salt, inorganic acid salt, hydroxides, or mixtures thereof. The alkali metal or alkaline earth metal salts of weak acids, both organic carboxylic acids having from 2 to 18 carbon atoms and inorganic acids, have been found especially useful as the alkaline components. It has also been found preferable to admix an alkali metal or alkaline earth metal hydroxide with the organic or inorganic acid salt in formulating the alkaline solution. In another method of operation, the alkali metal or alkaline earth metal hydroxide may be employed alone or an alkaline solution comprising the hydroxide may be utilized in conjunction with another alkaline solution during a sequential reactivation procedure. Sodium and potassium salts and hydroxides have been found to be the preferred alkaline constituents. Mixtures of either sodium or potassium acetate with sodium or potassium hydroxide are especially preferred. The use of potassium hydroxide and potassium acetate has been found to be particularly advantageous for the reactivation of the palladium-gold catalyst.

In general, the useful reactivation salts will be those whose aqueous solution have a pH greater than about 7. The salts may have such anions as citrate, acetate, borate, phosphate, tartrate, benzoate, aluminate, and the like. The use of halide anions should be avoided, since the presence of halides deleteriously affect the synthesis reaction.

The concentration of the alkali metal or alkaline earth metal salt or hydroxide in the alkaline solution may vary over a wide range of from about 0.25 to 30% by weight, and preferably from about 0.25 to 10%. The amount of alkaline solution employed also lacks criticality and may be at least about 0.1 to 10 liters per 350 grams of catalyst. However, the preferred amount is approximately 1 liter of a 10% alkali metal salt or hydroxide solution per 350 grams of catalyst.

Although the present invention has been described primarily with respect to the use of a palladium-containing catalyst, it is also possible to employ other Group VIII noble metals or platinum group metals such as platinum, ruthenium, rhodium, iridium, or mixtures thereof with each other or with palladium. The use of palladium metal or a catalyst comprising a combination of palladium metal and gold or platinum metals are particularly useful and are considered the preferred catalysts.

The aforementioned catalysts may be used in conjunction with an inert carrier. It is also possible to deposit the catalylst on the wall of the reactor, glass beads, etc., or to employ the catalyst in a fluidized bed or admixed with inert solids to prevent packing and plugging of the reactor. Particularly outstanding results are achieved, however, when the catalyst is deposited on an inert carrier. The preferred carriers are alumina or mixtures of barium, strontium or calcium carbonates with silica-alumina. The use of an alumina carrier is especially preferred.

In general, only catalytic amounts of the catalysts need be employed in the vinylation process. The total metal content of the catalyst may range from about 0.1 to 5% by weight, based on the weight of the inert carrier, with a preferred range being from about 0.5 to 2% by weight.

As previously discussed, the catalyst may be activated prior to its use in the synthesis reaction with a minor amount of an alkali metal or alkaline earth metal organic acid salt, inorganic acid salt, or hydroxide. The mount of the activator added may range from about 20 to 1000%, preferably from about 50 to 250%, by weight based on the total weight of the metals content. The same alkali metal or alkaline earth metal compounds employed for reactivation may be used for preactivation.

The esterification process of this invention is generally carried out at a temperature between about 0° and 350° C., and preferably from about 50° to 250° C.; and under pressure conditions that may range from about 15 to 1500 p.s.i., and preferably at a pressure within the range of about 15 to 250 p.s.i. It will be understood, however, that neither the temperature nor the pressure conditions are considered to be critical with respect to the reactivation method of this invention. The ester synthesis is generally conducted under substantially anhydrous conditions either in the liquid or vapor phase, and the latter mode of operation is preferred. When operating in the vapor or gaseous phase, the feed materials (ethylene, oxygen and acetic acid vapors) are passed into the reaction zone containing the catalyst. The vaporous reaction product mixture recovered from the reaction zone is treated to remove the vinyl acetate therefrom and the unreacted feed material recycled. The synthesis can be conducted in either a continuous or semi-continuous manner.

Although the vinylation process has been described above with respect to the use of ethylene for the preparation of vinyl acetate, it will be understood that alkenes having from 2 to 18 carbon atoms per molecule may be effectively employed to prepare the corresponding unsaturated organic esters. Illustrative alkenes include ethylene, propylene, butene-1, butene-2, isobutylene, octadecene-1, pentene-2, pentene-3, and the like. Other unsaturated hydrocarbons which may be employed in the process of this invention include butadiene, styrene, allyl acetate, allyl benzene, ethyl acrylate, hexadiene-1,5, etc., as well as mixtures of one or more of the above compounds.

Acetic acid is the preferred organic acid utilized in the process of this invention. However, other acids which may be employed include phenyl acetic, propionic, isobutyric, benzoic, p-toluic, and mixtures thereof. The organic acid reactant may have the formula R'COOH wherein R' is a substituted or unsubstituted branched or straight chain, aliphatic, cycloaliphatic or aromatic radical having from about 2 to 17 carbon atoms per molecule, and preferably between 2 and 10 carbon atoms per molecule because of the inherently low vapor pressures.

The reactivation treatment of this invention is commenced by stopping the synthesis reaction and by lowering the temperature and pressure to ambient conditions, preferably from about 20° to 100° C. and from about 0 to 15 p.s.i.g. As discussed above, either of two general procedures is next employed. The reactor may be flooded with the alkaline solution and left to soak for about 15 to 60 minutes, preferably from about 15 to 30 minutes, draining off substantially all free liquid, and repeating the treatment until the requisite amount of alkaline solution has been used or until the withdrawn liquid is substantially colorless or a very light straw or yellow color. The other general procedure involves continuously or intermittently pumping the alkaline solution through the catalyst bed until the aforedescribed conditions are achieved.

The invention will be more fully understood by reference to the following illustrative embodiments.

EXAMPLE I (A) 340 gms. of Pd catalyst on alumina preactivated with sodium acetate was used in a 1" x 36" reactor for the production of vinyl acetate from acetic acid, ethylene and oxygen in the vapor phase. After 500 hours of use over the temperature range of 290 to 305° F. and pressure range 35 to 85 p.s.i.g., the production rate of vinyl acetate (VA) decreased from 7 to 2 lbs. VA/lb. Pd/hr.

The bed was then reactivated by passing 1 liter of 10 percent sodium acetate in water through the catalyst bed. This was done in 5–200 ml. aliquots. 200 ml. of the solution was retained by the bed. The bed was dried under a nitrogen stream at 275° F. After a brief synthesis production rate increased from 2 to 7.5 lbs. VA/lb. Pd/hr.

(B) After 270 hours of operation at 295° F. and 85 p.s.i.g., the production rate decreased from 7.5 to 4.7 lbs. VA/lb. Pd/hr. The reactivation procedure of Run A was repeated and the production rate was increased to 13 lbs. VA/lb. Pd/hr.

EXAMPLE II 113 gm. of a Pd/Au catalyst on alumina preactivated with sodium metaborate was used in a 1" x 30" reactor for the vapor phase production of vinyl acetate from ethylene, oxygen and acetic acid. After 350 hours of operation at 125° C., 50 p.s.i.a., and 9/1/2C₂H₄/O₂/HAc feed ratio the utility dropped to 6.5–7.0 lb. VA/lb. Pd./hr. from the starting 9.0 lb. VA/lb. Pd/hr. At this point, the feeds were stopped, and the catalyst bed cooled to 60–80° C. with an argon purge. The bed was then washed with a 10% Na₂B₄O₇·8H₂O+0.25% NaOH aqueous solution. The washing was accomplished by pumping the wash solution in the reactor outlet at 8–10 ml./min. and collecting the wash effluent from the reactor inlet. A total of 1 liter of wash solution was used and the bed was soaked for 30 minutes prior to pumping the last 100 ml. The bed was dried under an argon stream and after a brief conditioning period the utility rose to 8.5 lbs. VA/lb. Pd/hr.

EXAMPLE III

The following procedure was used to regenerate catalysts (2% Pd, 0.3% Au on alumina support) which had been contaminated with tars during vinyl acetate operations. Twelve gram batches of the low activity were placed in ¾" O.D. glass tubes, suspended on glass wool, and covered by the wash solution as indicated in the Table I below. They were permitted to stand 15 minutes, then they were washed at room temperature by periodically removing 10 to 20 ml. of solution from the bottom of the tube while adding fresh solution to the top. Washings were continued until effluent was either clear or a very light straw color. When final wash had been completed and catalyst beds drained, nitrogen was passed at temperatures up to about 140° C. to remove excess water. When dry, activities in the synthesis of vinyl acetate were determined by passing a mixture of 15% O₂ in C₂H₄, saturated in acetic acid at 70° C. (over 10 g. of catalyst held at 140° C.) at a rate of 1.5 liters per hour.

TABLE I

| | Wash procedure (12 g. cat.) | | | mM. Va/hr./10 g. cat. | |
|---|---|---|---|---|---|
| Run | Wash solution | Vol. | Time, hrs. | 2 hrs. | 24 hrs. |
| A | None | | | 4.6 | 5.5 |
| B | 5% NaOAc | 160 | 2 | 4.8 | 6.2 |
| C¹ | (a) 5% NaOAc | 150 | 2 | 6.4 | 7.2 |
| | (b) 4% NaOAc | 150 | | | |
| D² | (a) 5% NaOAc | 60 | 2 | 7.5 | 8.0 |
| | (b) 5% NaOH | 120 | | | |
| | (c) 5% NaOAc | 50 | | | |
| E | 2% NaOH | 200 | 3 | 6.3 | 8.0 |

¹ Washes (a) and (b) were sequential, wash (b) was mixed NaOAc-NaOH.
² Washes (a), (b) and (c) were sequential.

EXAMPLE IV (A) 110 gms. of a Pd/Au catalyst on alumina preactivated with sodium acetate was used in a 1" x 30" reactor for the production of vinyl acetate from acetic acid, ethylene and oxygen in the vapor phase. The operating range was 125–142° C., 50 p.s.i.a. and 10/1/2 to 7/1/2 molar feed ratio of C₂H₄/O₂/HAc. After the catalyst had been on stream for 1904 hours and had four previous regeneration washes, it was washed again with a 10% NaOAc+0.25% NaOH solution. The washing was accomplished by pumping the wash solution into the reactor outlet at a rate of 7–10 ml./min. at 60–80° C. and collecting the wash effluent from the reactor inlet. After 600 ml. of wash solution was used, with a 30 minute soaking of the catalyst after 500 ml., the wash effluent was clear. Following the washing, the catalyst was dried under a stream of argon and after a 24 hour conditioning period the vinyl acetate production increased from 7.5 to 8.5 lbs. VA/lb. Pd/hr.

(B) The same catalyst was washed again after 2523 hours where the operating conditions were the same except the molar feed ratio was 6/1/2C₂H₄/O₂/HAc. The washing procedure was the same and after 700 ml. of wash solution were used, with a 30 min. soaking of the catalyst bed after 600 ml., the wash effluent was clear. After drying the bed with a stream of argon and a 16 hour conditioning period, the vinyl acetate production increased from 7.3 to 8.5 lbs. VA/lb. Pd/hr.

(C) 108 gms. of a Pd/Au catalyst was used in a different reactor unit, however, for the same purpose as in Example IV-A. This catalyst was on stream for a total of 309 with 88 hours of Reagent Grade Acetic Acid and 221 hours of recovered distilled acetic acid in the feed stream. The operating conditions ranged from 125–127° C., 50 p.s.i.a. and 9.5–8.8/1/2C₂H₄/O₂/HAc molar feed ratio. After 309 hours on stream, the utility dropped to 6.7 lbs. VA/lb. Pd/hr. and the bed was washed with 10%

NaOAc+0.25%

NaOH as described in Examples A and B. After 1 liter of wash solution was used, with a 30 minute soaking of the bed after 800 ml., the wash effluent was clear. After drying the bed with a stream of argon and a 23 hour conditioning period, the vinyl acetate production increased from 6.7 to 8.0 lbs. VA/lb. Pd/hr.

EXAMPLE V (A) 113 gms. of catalyst (Pd/Au—originally activated with sodium acetate) which had been on stream 511 hours in a vinyl acetate vapor phase synthesis operation at 125–137° C. and 50 p.s.i.a. was washed with a 10%

NaOAc+0.25%

NaOH solution at 60–80° C. The washing was accomplished by pumping the solution in the reactor outlet at 8–10 ml./min. The first effluent was very dark and began to lighten somewhat after 100 ml. After 1250 ml., the wash was still colored and the bed was allowed to soak for 20 minutes. The drainings from the soak were somewhat darker than the last effluent. The catalyst was washed with an additional 300 ml. and the wash cleared but still had some color. After synthesis operations were again commenced, the vinyl acetate production increased from 7.1 lbs. VA/lb. Pd/hr. to 9.3 lbs. VA/lb. Pd/hr. from the washing.

(B) A Pd/Au catalyst originally activated with 2% KOAc was washed with a solution of 5% KOAc+0.5% KOH. The washed catalyst showed even better activity and stability than the regenerated catalyst of Run (A) above.

In accordance with another aspect of this invention, the use of an alkaline solution to wash the catalyst was found to have the advantage of retaining the catalyst metal or metals on the support. However, if a non-alkaline aqueous solution is employed as one of the treating steps; a fine suspension of solid particles, almost colloidal in nature, was observed in the aqueous wash effluent. A qualitative spectrographic analysis of these fines showed the presence of catalyst metals. Such a metal loss would obviously be quite detrimental in large scale commercial operations where the catalyst is subjected to numerous regeneration treatments in order to maintain its activity. The deleterious effect of the use of a non-alkaline aqueous wash solution is illustrated below.

EXAMPLE VI

An alumina supported palladium-gold catalyst (originally activated with potassium acetate) had been on stream for 653 hours producing vinyl acetate in a vapor phase process utilizing ethylene, oxygen and acetic acid. Approximately 148 ml. of catalyst was regenerated by washing with 1500 ml. of a 5% KOAc+0.5% KOH solution at 60–80° C. at rate of 8–10 ml./min. The thus treated catalyst was washed with 1500 ml. of deionized water at the same conditions. The following observations were made during the water washing step.

(1) In the first 500 ml. of effluent the pH dropped from pH 11 to 8. The effluent was grayish in color and contained a fine black precipitate which settled upon standing.

(2) In the next 500 ml. of effluent the pH dropped from 7 to 6. The effluent was brownish-black in color. A fine precipitate was present but did not settle upon standing.

(3) In the last 500 ml. of effluent the pH dropped from 6 to 5. The effluent was grayish in color.

The three effluent solutions were filtered through Whatman No. 40 filter paper, the paper was dried and submitted for spectrographic analysis. Each analysis revealed the presence of palladium and gold metals as well as other metals originally present in the catalyst support. In contrast, when the step of washing the catalyst with deionized water was omitted, the effluents obtained using a 10% KOAc+0.5% KOH wash solution did not contain the fine metal precipitates.

The above data demonstrate that the reactivation method was quite effective in restoring catalyst activity by the removal of contaminants therefrom and by maintaining the presence of an activator on the catalyst.

While particular embodiments of this invention are shown above, it will be understood that the invention is obviously subject to variations and modifications without departing from its broader aspects.

What is claimed is:

1. A method for reactivating a base-activated palladium metal-containing catalyst effective in the synthesis of vinyl acetate from ethylene, acetic acid and oxygen which comprises sequentially washing the palladium catalyst having reduced catalytic activity with an aqueous alkaline solution containing an alkali metal or alkaline earth metal organic carboxylic acid salt, hydroxide or mixtures thereof until the resulting wash effluent is either substantially colorless or a very light straw color; and then drying the thus treated palladium catalyst, under a stream of inert gas.

2. The method of claim 1 wherein said catalyst is a combination of palladium and platinum.

3. The method of claim 1 wherein said alkaline solution is an aqueous solution of sodium acetate.

4. The method of claim 1 wherein said alkaline solution is an aqueous solution of sodium acetate and sodium hydroxide.

5. The method of claim 1 wherein said alkaline solution is an aqueous solution of sodium hydroxide.

6. The method of claim 1 wherein said catalyst is a combination of palladium and gold.

7. The method of claim 6 wherein said alkaline solution is an aqueous solution of potassium acetate and potassium hydroxide.

References Cited

UNITED STATES PATENTS

| | | | |
|---|---|---|---|
| 2,473,880 | 6/1949 | Gwynn | 252—414 |
| 2,925,391 | 2/1960 | Lait et al. | 252—412 |
| 3,190,912 | 6/1965 | Robinson | 260—497 |
| 3,194,844 | 7/1965 | Silber | 252—412 |
| 3,214,385 | 10/1965 | Kolyer | 252—412 |
| 3,277,159 | 10/1966 | Schaeffer | 260—497 |
| 3,373,189 | 3/1968 | Lum | 260—497 A |
| 3,480,558 | 11/1969 | Lum et al. | 252—416 |

FOREIGN PATENTS

| | | | |
|---|---|---|---|
| 618,071 | 9/1962 | Belgium | 260—497 |
| 747,415 | 11/1966 | Canada | 260—497 |
| 1,017,938 | 1/1966 | Great Britain | 260—497 |

DANIEL E. WYMAN, Primary Examiner

P. E. KONOPKA, Assistant Examiner

U.S. Cl. X.R.

252—414; 260—497 A